May 11, 1926.

T. NEGOWSKI ET AL

TIRE CHAIN

Filed April 22, 1925

1,584,636

Theophil Negowski
Aloysius A. Nowicki
INVENTOR

BY Victor J. Evans
ATTORNEY

WITNESS:

Patented May 11, 1926.

1,584,636

UNITED STATES PATENT OFFICE.

THEOPHIL NEGOWSKI AND ALOYSIUS A. NOWICKI, OF WINONA, MINNESOTA.

TIRE CHAIN.

Application filed April 22, 1925. Serial No. 25,111.

Our invention relates to an anti-skid chain for tires and its principal object is to provide an anti-skid chain that will prevent the side skid whether driving straight ahead or making a short turn.

A further object of the invention is to provide an anti-skid chain embodying a plurality of transverse anti-skid chains each of which is constructed from a plurality of links whose ends project at a substantial right angle and affords traction ground gripping elements.

With the preceding and other objects and advantages in view, the invention consists in the novel combination of elements, construction, arrangement of parts and operations, to be hereinafter specifically referred to, claimed and illustrated in the accompanying drawings, wherein:—

Figure 3:
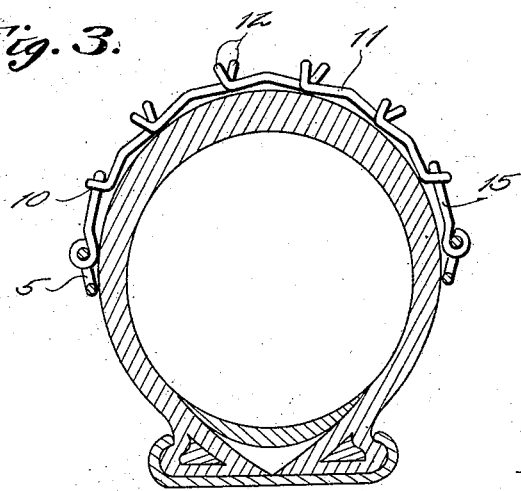
Figure 3 is a transverse sectional view of the tire showing the invention associated therewith.
Figure 4:
Figure 4 is a perspective of two of the links connected together.

Referring to the drawings in detail wherein corresponding characters of reference denote corresponding parts throughout the several views, the numeral 5 designates a pair of circumferential side chains with which the invention is associated. Our improvement consists of a transverse chain 10 embodying a plurality of elongated links 11. These links 11 have their ends bent at a substantial right angle with respect to the longitudinal axis of the links as at 12 so that the adjacent ends of the links will contact with each other as shown in Figure 3. Also these right angular projecting ends provide traction or antiskid elements.

Figure 1:
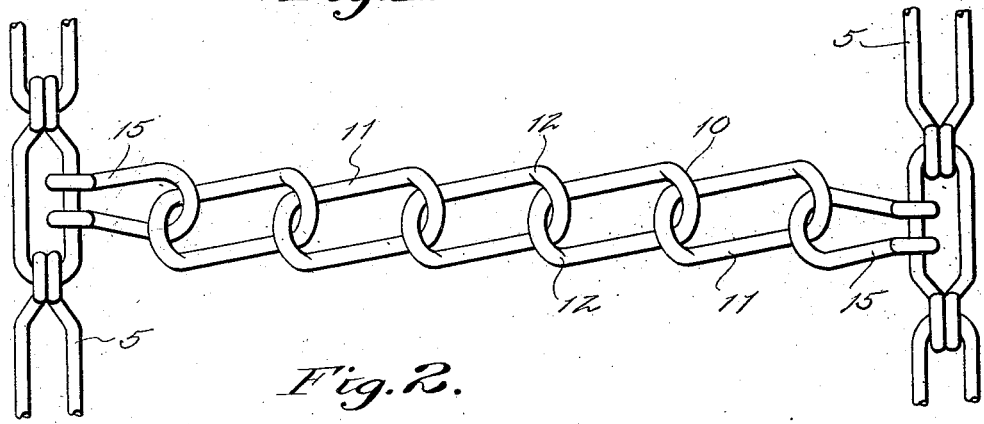
Figure 1 is a fragmentary top plan view of an anti-skid chain constructed in accordance with our invention.
Figure 2:
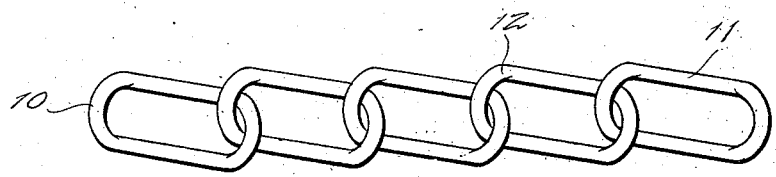
Figure 2 is an elevation of the transverse anti-skid element.

As shown in Figure 1, these links are arranged with their sides arranged inwardly to each other. In other words, the links are arranged in stepped relation so that they will be gradually brought in contact with the slippery roadway and thereby gradually cause the wheel to grip the road. This eliminates the sudden stopping of the wheel and the consequent side skidding.

The endmost links of the transverse anti-skid elements carry conventional links 15 that are engaged with the side chain 5.

While we have shown and described the preferred embodiment of the invention, we desire to have it understood that such changes may be made in the form, construction, arrangement of parts and operations, as will not depart from the spirit of the invention or the scope of the subjoined claim.

What is claimed is:—

An anti-skid chain comprising a pair of side chains and a transverse chain connected therewith, the transverse chain including a plurality of elongated links arranged in stepped relation, the ends of the links being extended at substantially right angles and the abutting ends of each pair of links being in contacting relation and affording ground engaging elements.

In testimony whereof we affix our signatures.

ALOYSIUS A. NOWICKI.
THEOPHIL NEGOWSKI.